United States Patent [19]

Bratlie

[11] Patent Number: 5,509,723
[45] Date of Patent: Apr. 23, 1996

[54] PORTABLE ROTARY TRAILER TIPPER

[75] Inventor: Kenneth A. Bratlie, Portland, Oreg.

[73] Assignee: Columbia Trailer Co., Inc., Hillsboro, Oreg.

[21] Appl. No.: 138,500

[22] Filed: Oct. 15, 1993

[51] Int. Cl.⁶ .................................................. B65G 67/30
[52] U.S. Cl. ...................... 298/18; 298/175 G; 414/360; 414/366; 414/372; 414/390
[58] Field of Search .................................. 298/17 SG, 18, 298/414, 300 S; 414/354, 359, 360, 362, 364, 366, 371, 372, 382, 390, 397, 575, 576, 577, 581, 300

[56] References Cited

U.S. PATENT DOCUMENTS

| | | |
|---|---|---|
| 516,053 | 3/1894 | Hulett . |
| 577,500 | 2/1897 | Wilson . |
| 1,759,757 | 5/1930 | Patten et al. . |
| 2,020,231 | 11/1935 | Bell . |
| 2,411,228 | 11/1946 | Poulsen .................................. 414/366 |
| 2,601,163 | 6/1952 | Miller . |
| 2,608,311 | 8/1952 | Findlay . |
| 2,786,587 | 3/1957 | Straight . |
| 3,116,843 | 1/1964 | Clark . |
| 3,412,879 | 11/1968 | Hansen . |
| 3,499,561 | 3/1970 | Beckwith . |
| 3,528,571 | 9/1970 | Reid et al. . |
| 3,819,070 | 6/1974 | Clarke et al. . |
| 4,204,793 | 5/1980 | Lemaire . |
| 4,213,726 | 7/1980 | Robnett et al. . |
| 4,280,779 | 7/1981 | Warner et al. ............................ 298/18 |
| 4,382,631 | 5/1983 | Johnson ............................. 298/17 SG |
| 4,483,650 | 10/1984 | Sims . |
| 4,505,361 | 3/1985 | Warner et al. ........................... 414/576 |
| 4,685,851 | 8/1987 | Dowden . |
| 5,017,077 | 5/1991 | Dowden . |
| 5,059,081 | 10/1991 | Brown et al. . |
| 5,080,548 | 1/1992 | Bratlie et al. . |

FOREIGN PATENT DOCUMENTS

| | | | |
|---|---|---|---|
| 1317466 | 1/1963 | France .................................... 414/366 |
| 1177075 | 8/1964 | Germany ................................ 414/366 |
| 619362 | 4/1961 | Italy ....................................... 414/366 |
| 288659 | 11/1971 | U.S.S.R. ................................. 414/366 |
| 546545 | 3/1977 | U.S.S.R. ................................. 414/366 |
| 2070555 | 9/1981 | United Kingdom ................... 414/354 |

OTHER PUBLICATIONS

Appendix A ("Transporting Arrangement" design).

Primary Examiner—William E. Terrell
Assistant Examiner—Gregory A. Morse
Attorney, Agent, or Firm—Klarquist Sparkman Campbell Leigh & Whinston

[57] ABSTRACT

A portable rotary trailer tipper is provided for emptying the trailer contents through opening the open top of the trailer. The tipper includes an elongated transport that is portable and supports a trailer inverter. A platform for supporting the trailer is positioned along one side of the transport. A dumping chute for receiving the material dumped from the trailer is positioned along the opposite side of the transport. A trailer positioned upon the platform is engaged by the inverter then rotated upwardly and across the transport to dump material from the trailer into the chute. The chute directs the dumped material into a landfill site. A method of emptying material successively from a stream of trailers is also provided.

15 Claims, 5 Drawing Sheets

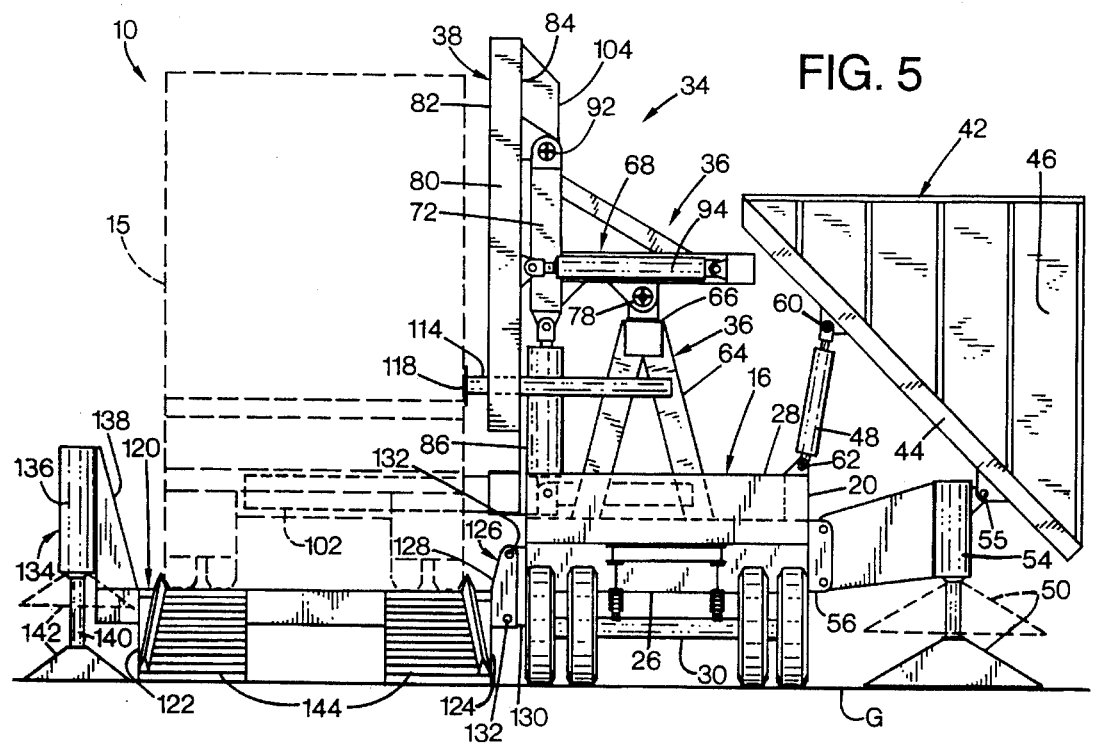
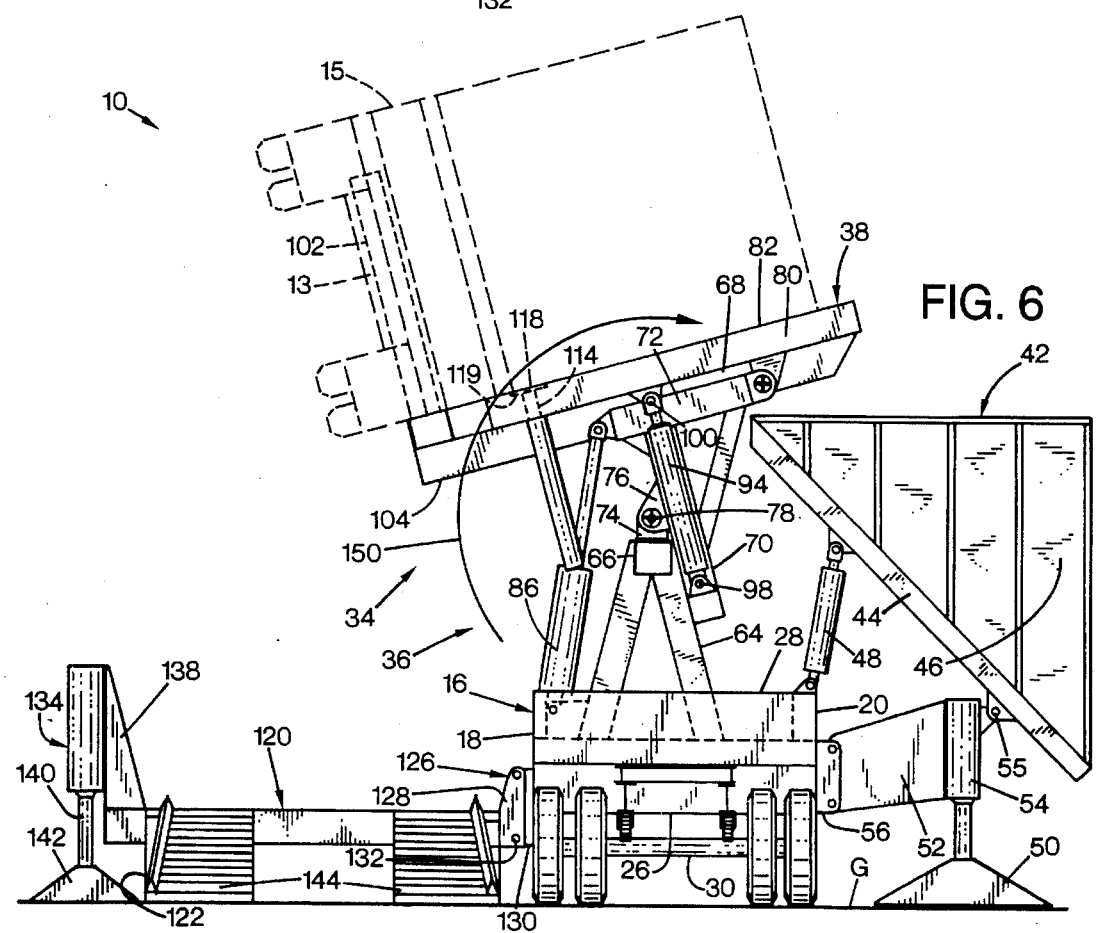

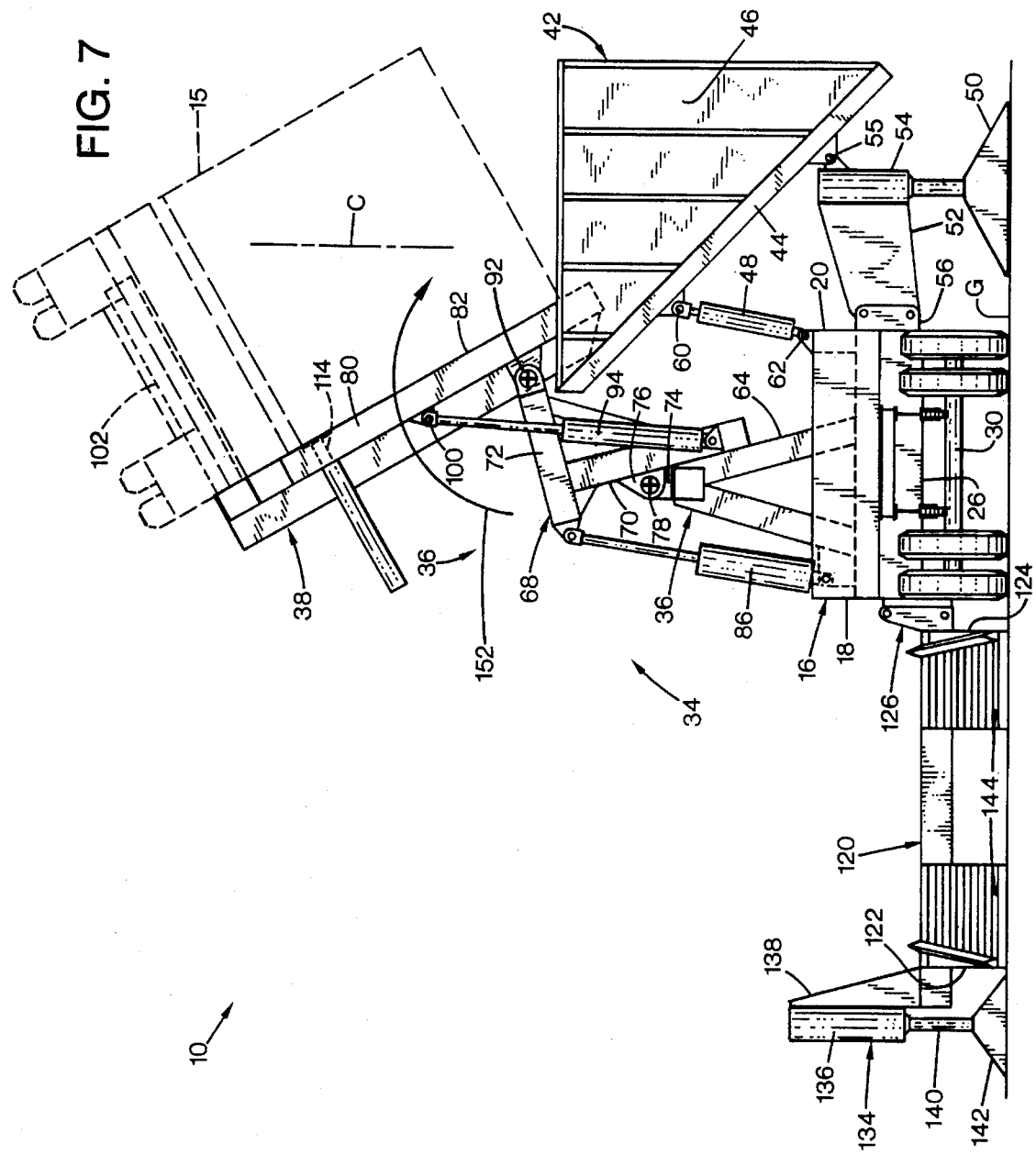

PORTABLE ROTARY TRAILER TIPPER

BACKGROUND OF THE INVENTION

The present invention relates generally to a trailer tipper for dumping a trailer containing a dumpable material, and more particularly, to an improved portable rotary tipper and an improved method for emptying a trailer container of a type hauled by tractor-trailers or semi-trucks. For example, such a tipper and method for emptying trailers may be used to efficiently remove refuse from trailers at a landfill site.

Other portable trailer tippers have been used to dump garbage from semi-truck haulable trailers at landfill sites. These earlier tippers raise the front end of the trailer containers to dump the contents from the back end of the trailer. Such tippers usually have an elongated deck with a tipping frame mounted thereon. Each trailer must be carefully backed by a tow truck up ramps, and then onto the tipping frame, where it is disconnected from the tow truck. The front end of the tipping frame is then pivoted upwardly from the deck to dump the contents of the trailer through a door at the rear of the trailer. After dumping, the tipping frame is lowered, the empty trailer is hitched to the tow truck, and the trailer is towed from the tipper. These earlier tippers and trailers suffer a variety of disadvantages.

For example, tipping an elongate semi-trailer longitudinally raises the front end of the trailer to a considerable height above the ground. Unfortunately, these earlier tippers typically have both a high center of gravity and a high profile during tipping. Either of these conditions may lead to instability if the tipper shifts upon soft ground at a landfill site, or if high winds occur during the tipping operation.

Furthermore, the back doors on these earlier trailers offer only a relatively small passageway for dumping, so refuse tends to accumulate in a relatively small area adjacent the tipper. The refuse pile may quickly grow to obstruct the flow of material from the trailer rear doors. It is often necessary to use a bulldozer to clear the pile away from the tipper after each dumping cycle.

The rear doors of a trailer may also become jammed from within during dumping. Large objects or sticky substances in the refuse may clog the rear door, causing a bottleneck in the dumping. Furthermore, the back doors on these earlier refuse trailers are commonly required to be specially sealed during railroad or highway transport. For instance, trailer containers that are transported on railroads are required to have doors sealed to withstand a 20-foot drop crash, when fully loaded, without opening or leaking. Repeated door-sealing operations eventually damage the doors so that they must be replaced frequently, typically after about six dumping cycles.

Thus, a need exists for an improved trailer tipper and method for dumping the contents from a trailer that is directed toward overcoming, and not susceptible to, the above limitations and disadvantages.

SUMMARY OF THE INVENTION

According to one aspect of the present invention, a portable trailer tipper is provided for tipping a trailer sideways to dump material contained in the trailer through an opening in the top of the trailer. The tipper has a portable elongate transport with a longitudinal axis and opposing first and second sides. The tipper also has a trailer inverter with a carriage and a tipper device mounted to the transport to support the carriage. The carriage is configured to selectively engage a trailer positioned adjacent the transport first side. When so engaged, the tipper device inverts the carriage about at least one axis which is substantially parallel to the longitudinal axis to dump material from the open top portion of the trailer beyond the second side of the transport.

According to an illustrated embodiment, the tipper has a dumping chute positioned alongside the opposite longitudinal side of the transport. The dumping chute receives and conveys the contents of the tipped trailer into a landfill site. The tipper may also include a trailer platform positioned alongside the transport to support the trailer at an elevation for engagement by the tipper device. The trailer platform may have ramps at each end to permit the trailer to be transported over the platform in a uniform direction.

According to a further aspect of the present invention, a method is provided of successively removing the contents from a plurality of trailers by using the tipper described above.

An overall object of the present invention is to provide an improved trailer tipper for emptying the contents of a trailer.

A further object of the present invention is to provide an improved portable tipper that may be moved quickly and efficiently between locations at a landfill site.

An additional object of the present invention is to provide an improved method of emptying the contents of a trailer to yield a high rate of successive trailer dumping cycles.

A further object of the present invention is to provide a portable tipper which is safer to operate than earlier tippers, and which eliminates the need for resealable trailer dumping doors.

These and other objects, features and advantages of the present invention will become apparent to those skilled in the art from the following description and drawings.

BRIEF DESCRIPTION OF THE DRAWINGS

FIG. 5 is a front end elevational view of the tipper of FIG. 1, showing a trailer and retracted stabilizers in dashed lines.

FIGS. 6 and 7 are front end elevational views of the tipper of FIG. 5, shown in two sequential stages of tipping.

DETAILED DESCRIPTION OF A PREFERRED EMBODIMENT

Figure 1:
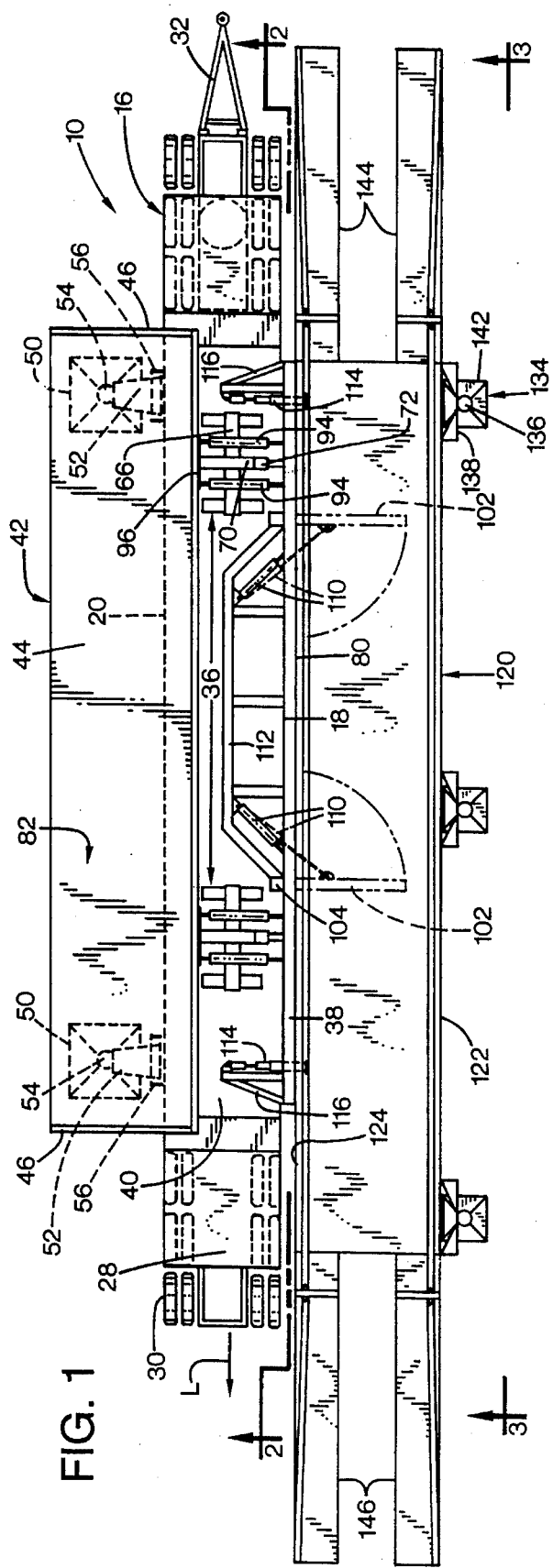
FIG. 1 is a plan view showing one form of a portable tipper of the present invention.
Figure 2:
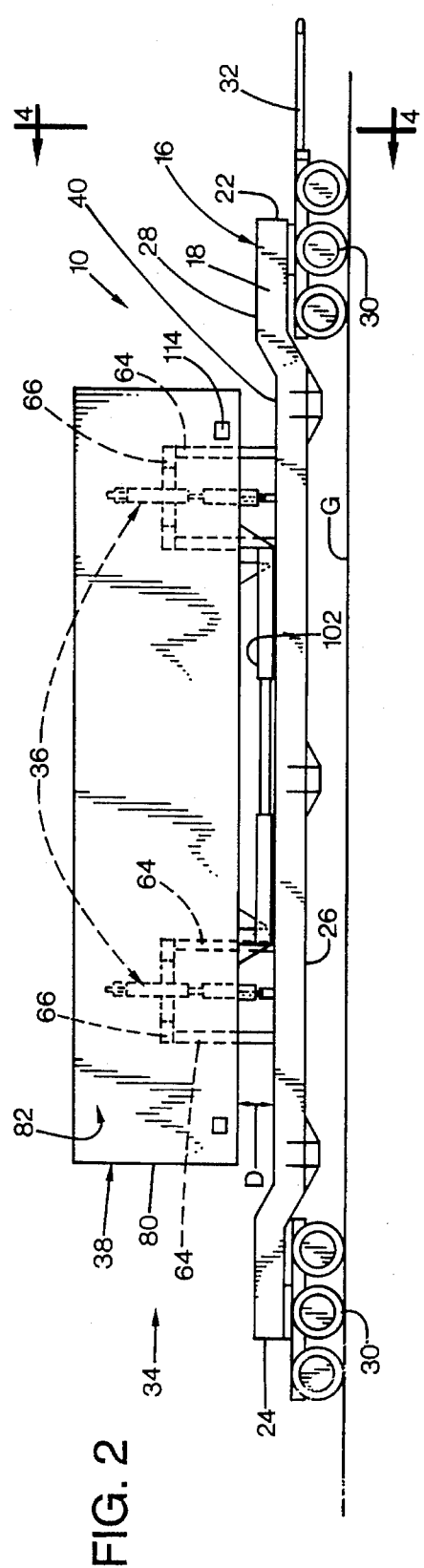
FIG. 2 is a side elevational view of a portion of the tipper of FIG. 1, taken along line 2—2 thereof.
Figure 3:
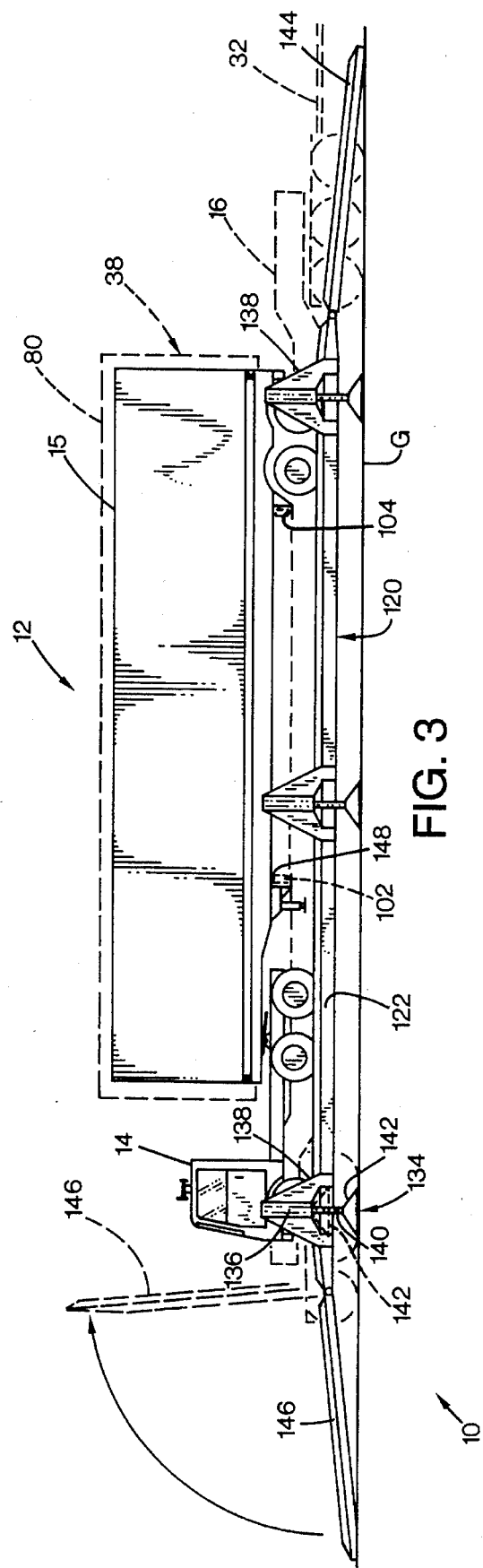
FIG. 3 is a side elevational view of another portion the tipper of FIG. 1 taken along line 3—3 thereof, showing a trailer and a tow truck positioned on the tipper, with a ramp shown in dashed lines in a retracted position, and other portions of the tipper also shown in dashed lines.

FIGS. 1–4 illustrate an embodiment of a portable sideways trailer dumper apparatus or tipper 10 constructed in accordance with the present invention for emptying the contents from a portable container, and particularly from a tractor-trailer unit 12 having a semi-truck 14 towing a trailer 15 (see FIG. 3). Such trailers 15 typically have an elongated container defined by a bottom wall, and four upright walls which have upper edges defining an upper or top opening for receiving a dumpable material within the container. The trailer 15 has a center of gravity which advantageously travels along line C during dumping, and remains over a portion of the preferred tipper 10 during an emptying cycle (see FIG. 7). The trailer 15 may contain any dumpable material, e.g., refuse, garbage, or other bulk-transportable materials, capable of being removed through the trailer top opening under the force of gravity when the trailer 15 is inverted by tipper 10, as shown in FIGS. 5–7. The refuse-laden trailer 15 may be transported by rail, barge or highway to a dumping site, such as a landfill for depositing the material therein.

Referring now to FIGS. 1–3, the tipper 10 includes a portable, elongated transport 16 with a frame having a longitudinal axis L, and opposing first and second lateral sides 18, 20, front and back ends 22, 24, an underside 26, and a bed 28. As best seen in FIG. 2, for portability, the transport 16 has a pair of wheel assemblies 30, each with a trio of wheeled axles. The wheel assemblies 30 are attached to the transport underside 26 at the first and second opposing transport ends 22, 24.

The transport 16 also includes towing or hitching means, such as hitch 32, attached to the assembly 30 under the transport front end 22. Using hitch 32, the transport 16 may be advantageously hitched to a towing vehicle (not shown), such as a semi-truck 14 or a bulldozer (not shown). When hitched to a semi-truck 14, the tipper 10 may be transported along a highway between distant dumping sites. When hitched to a bulldozer (not shown), the tipper 10 may be moved to a new dumping location at a dump site.

The tipper 10 also has a trailer inverting apparatus or inverter 34. The illustrated inverter 34 has a pair of tipper mechanisms or devices 36 and a tipping carriage 38. The carriage 38 is pivotally and translationally coupled by the tipper devices 36 to the bed 28 of the transport 16. The carriage 38 extends along the transport first side 18 to engage and support the trailer 15 during tipping (see FIGS. 5–7). Details of the construction and operation of the inverter 34 are described further below, following a description of the other main components of tipper 10. The transport bed 28 slopes downwardly from regions immediately above the wheel assemblies 30 to a flat intermediate section 40 that supports the tipper devices 36. The lower elevation of the bed intermediate section 40 contributes to the tipper 10 having a low profile.

The tipper 10 preferably also has a dumping chute 42 attached along the second side 20 of the transport 14. The chute 42 receives the material dumped through the top opening of the trailer 15 and conveys the material to the landfill site. The material being emptied from trailer 15 slides down an upper surface of a declined chute floor 44. The chute floor 44 is ordinarily at an operating angle relative to a ground surface G that permits substantially all of the dumped material to slide across the chute surface and into the landfill site. The chute has a pair of upright guide walls 46 extending upwardly from the opposing ends of the chute floor 44. The guide walls 46 prevent material from spilling over the ends of the chute 42, and instead, channel the material being dumped into the desired location.

The chute 42 is supported at opposing ends in its ordinary operating position by a pair of extendable chute actuators 48, and a pair of retractable, ground-engaging stabilizer pads 50. Each pad 50 is coupled to a stabilizer support member 52 by an actuator 54 which raises and lowers pad 50. The support member 52 is pivotally coupled to an underside of the chute floor 44 along a pivot axis 55. The transport 16 includes two pair of flange plates 56 that extend from the second side 20, with each pair of plates 56 receiving one support member 52 therebetween. The support member 52 may be removably coupled to the plates 56 by connectors 58, such as bolts, pins, or the like. The extension or stroke length of the actuators 54 is adjustable to vary the elevation of the associated support members 52 to provide stable support for the dumping chute 42 over a wide variety of conditions of the ground G.

Figure 4:
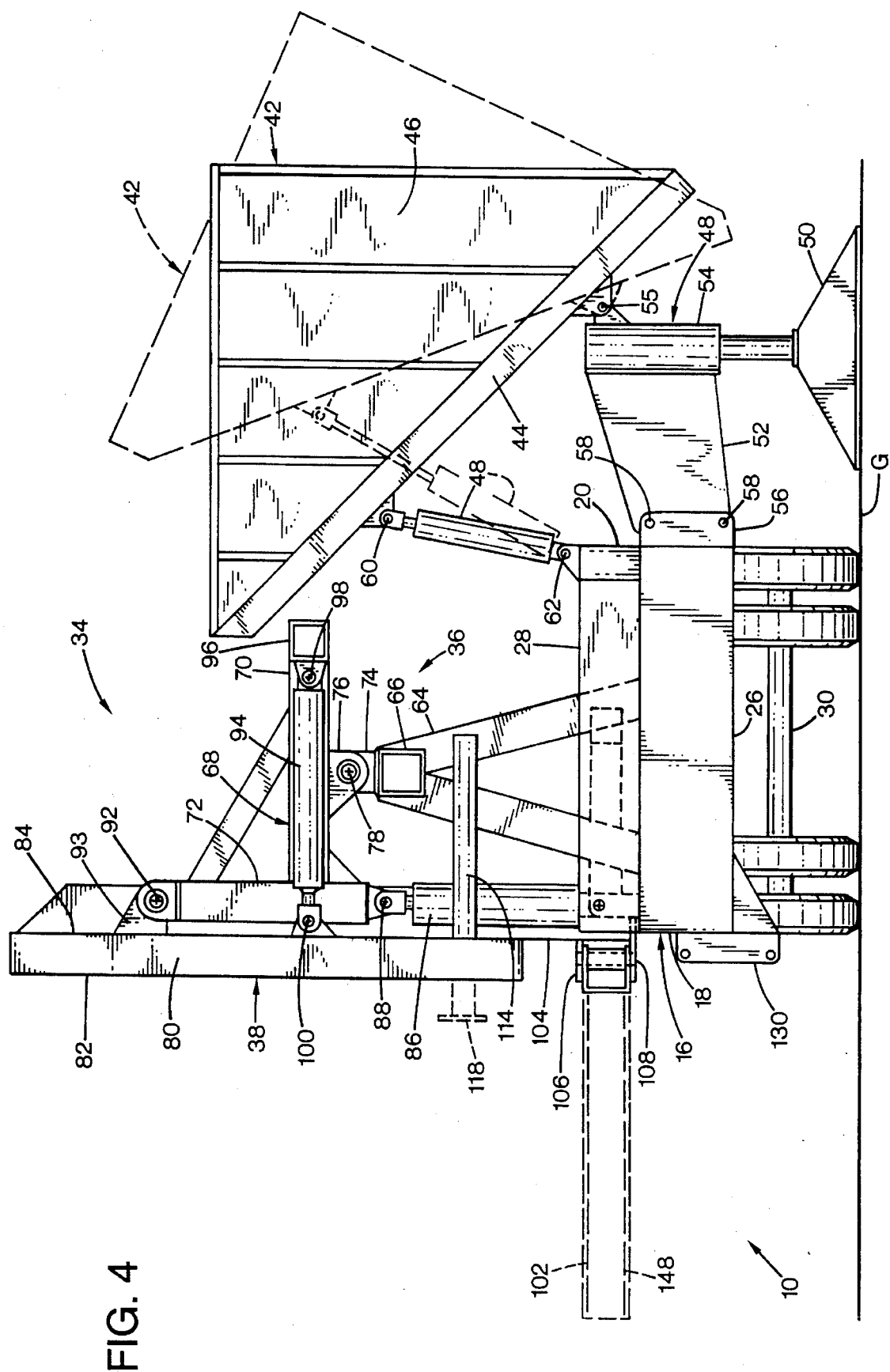
FIG. 4 is a front end elevational view taken along line 4—4 of FIG. 2.

The chute 42 is also connected to the transport bed 28 by a pair of actuators 48. As best seen in FIG. 4, the actuator 48 is pivotally attached at pivot 60 to the underside of the chute floor 44 at a position above the pivot support axis 55. The lower end of actuator 48 is pivotally attached to the bed 28 at a pivot 62, near a corner of the intermediate section 40 of the bed. The chute actuators 48 are extendable to pivot the chute 42 about pivot axis 55 to increase the angle of the chute surface 44 relative to the ground G. When extended as shown in dashed lines in FIG. 4, the steeper position of the chute 42 facilitates the cleaning of the chute by means of a high-pressured water hose or the like. The chute 42 may also be used as a counterbalance in the extended position, as described further below.

As best seen in FIGS. 1, 2 and 4, the tipper device 36 has four inverted V-shaped frame members 64 arranged in two pairs, mounted at opposing ends of the bed intermediate section 40. A pivot anchor beam 66 is joined to the apexes of each pair of tipper frames. Each anchor beam 66 pivotally supports a T-shaped pivoting member 68.

Each T-shaped member 68 has a stem portion or stem 70 and a lateral portion or crossarm 72 (see FIG. 7). Referring now to FIG. 4, an intermediate portion of the stem 70 is pivotally mounted near the middle of the pivot anchor beam 66. The pivot connection is provided by a stationary anchor plate 74, extending upwardly from the middle of the pivot anchor beam 66, which is sandwiched between a pair of pivot plates 76, extending downwardly from the intermediate portion of stem 70. The anchor plate 74 and the pivot plates 76 each have aligned pivot holes that receive a first pivot shaft 78, about which the T-shaped member is pivotable relative to the frame of transport 16. The pivot shaft 78 is the first pivot point about which carriage 38 is rotated to invert the trailer 15.

Referring now to FIG. 4, the tipper 10 is shown in a rest position, which occurs at the beginning and end of a dumping cycle. The carriage 38 includes an upright elongate tipping wall 80 which has a front, trailer-engaging surface 82 and a back side 84. The carriage wall 80 is positioned along the transport first side 18 at a selected distance D (FIG. 2) above the bed intermediate section 40. Each T-shaped member 68 lays sideways with the crossarm 72 situated parallel to and adjacent the wall back side 84. Each tipping device 36 includes a primary actuator 86 pivotally coupled by shaft 88 to a lower end of the crossarm 72, and by a shaft 90 to the intermediate section 40 of the transport bed 28. An upper end of the stem 70 is pivotally attached by a pivot shaft 92 to a pivot anchor 93 extending from the wall back side 84. The shaft 92 is the second pivot point about which the carriage 38 rotates when dumping trailer 15.

Referring also to FIG. 1, each tipping device 36 also includes a pair of secondary actuators 94 pivoted to each end of an elongate actuator support member 96 by pivot shafts 98. The actuator support member 96 is preferably mounted to the stem base at an angle substantially perpendicular to the crossarm 72 (see FIG. 1). Each secondary actuator 94 extends along opposite sides of the stem 70 and pivotally attaches to the wall back side 84 at pivot shafts 100. As will be described below, the primary and secondary actuators 86, 94 extend in sequence to invert the carriage 38 to dump the contents from trailer 15.

The carriage 38 has a trailer engaging device which is selectively extendable to grasp the trailer 15 from the rest position (FIG. 5) and secure the trailer to the carriage during dumping (FIGS. 6–7). In the illustrated embodiment, this engaging device comprises a pair of trailer support arms 102 which extend by pivoting outwardly from beneath the tipping wall 80 to support trailer 15 during the dumping operation. Each support arm 102 is pivotally mounted to one of a pair of upright beams 104 of wall 80 (see FIGS. 1 and 4). The beams 104 extend along the wall back side 84 and beneath the wall 80 to support a pair of support arm pivot plates 106. Pivot shafts 108 (see FIG. 4) pivotally attach the support arms 102 to plates 106.

As seen in FIG. 1, a pair of support arm actuators 110 are each extendable to swing each associated support arm 102 outwardly from beneath the wall 80 to grasp trailer 15. Each actuator 110 is pivotally anchored to a pivot actuator frame 112 of the transport intermediate section 40. The other end of each actuator 110 is pivotally anchored to an intermediate portion of the support arm 102 (see dash-dotted lines in FIG. 1). The actuators 110 extend to swing the support arms 102 outwardly from the wall 80 to engagement positions generally perpendicular to the front surface of wall 80.

As best seen in FIGS. 1 and 4–7, a pair of trailer cushioning actuators 114 are disposed to extend their rams through opposing ends of carriage wall 80 perpendicular to surface 82. The housing of each actuator 114 is mounted to an actuator anchor frame 116 that extends from the wall back side 84 (see FIG. 1). For clarity, the anchor frames 116 have been omitted from the operational views of FIGS. 4–7. As seen in FIG. 5, before the tipping operation begins, a gap exists between the wall front surface 82 and the side of the trailer 15. The cushioning actuators 114 extend across this gap so that a head 118 of the actuator ram engages the side of the trailer 15.

The cushioning actuators 114 retract to cushion and regulate the movement of the trailer 15 toward the carriage wall front surface 82 as the inverter 34 operates to dump the trailer. The actuator head 118 retracts to a position flush with the wall front surface 82 so that the trailer may gently come to rest against the carriage wall 80. The carriage wall 80 has two head receiving recesses 119 (see FIG. 6) located around the intersection of the actuators 114 with the carriage wall front surface 82 to receive the actuator flat head 118. The cushioning actuators 114 may be any one of a variety of hydraulic, pneumatic, or other damping devices known to those skilled in the art.

Optionally, the tipper 10 may include a detachable trailer platform 120 for supporting the trailer 15 and attendant tow truck 14. The platform 120 has an outboard side 122 and an inboard side 124, which is removably attached along the transport first side 18 by at least two attachment assemblies 126. Each platform attachment assembly 126 comprises a pair of heavy sandwich plates 128 that extend from the platform inboard side 124. Each pair of sandwich plates 128 surround a single plate 130 extending from the transport side 18 (see FIG. 4). All three plates 128, 130 of each assembly 126 have aligned pairs of pin holes that receive heavy-duty removable attachment pins 132. The attachment pins 132 are preferably made of high-strength steel or titanium to provide secure attachment of the platform 120 to the transport 16.

The tipper 10 may have two, three or more platform stabilizers 134 supporting the outboard side 124 of the trailer platform 120 upon the ground G. As seen in FIGS. 1 and 3, each platform stabilizer has an actuator 136 attached to a trio of flanges 138 that extend upwardly from the outboard side of the trailer platform 120. Each actuator 136 has a shaft 140 extending downwardly and terminating with a pyramid-shaped stabilizer pad 142 that rests upon the ground G. The extension of the shaft 140 from the stabilizer actuator 136 may be independently adjustable for each stabilizer 134 to permit stable support for the trailer platform 120 over a wide variety of ground surface conditions.

The trailer platform 120 has a front ramp 144 and a back ramp 146 at opposing ends thereof (see FIGS. 1 and 3) which advantageously allow drive-through positioning of the trailer, rather than backing into position. For example, a truck 14 may tow trailer 15 up the ramp 144 onto the trailer platform 120 for emptying, and when complete, off the platform down ramp 146 after re-hitching the trailer to the truck. During dumping, the truck 14 may remain on the platform in position for re-hitching, an advantage not possible using the earlier tippers which dumped through trailer back doors. The front and back ramps 144, 146 are pivotally attached to the respective ends of the trailer platform 120 so that they may be pivoted upwardly for storage during platform transport (see dashed lines in FIG. 3 for ramp 146, for instance).

The trailer 15 is positioned upon the trailer platform 120 to receive the support arms 102 that swing outwardly from beneath the carriage wall 80. Raised tire stops or depressions (not shown) in the platform upper surface, or other positioning mechanisms known to those skilled in the art, may be provided to locate trailer 15 on platform 120 for dumping. As seen in FIG. 3, the undercarriage of the trailer has a receiver portion, such as a pair of C-channel receiver members 148 (see FIG. 4), for receiving the support arms 102. The support arms 102 swing outwardly, as shown in dashed lines in FIG. 1, into the C-shaped channel openings of the receivers 148.

When engaged in the receivers 148, the support arms 102 are closely nested between upper and lower walls of the C-shaped channels. The upper wall of each receiver 148 transmits the weight of the trailer 15 to the support arm 102 when the trailer is in a predominantly upright position, whereas the lower channel wall transfers the weight of the trailer to the support arm 102 when the trailer is inverted. Thus, the nesting of the support arms 102 within the channels of receivers 148 permits the support arms to maintain engagement with the trailer in both the upright and inverted positions, as well as other positions therebetween.

It is apparent that large loads and stresses are present in the tipper 10 during use. Thus, the connections between many of the elements of the tipper are preferably rigid, strong and durable. Welding may be used to connect many of the elements. It is also to be appreciated, however, that other fasteners such as heavy-duty rivets, bolts, and the like may be used with equally good results. Furthermore, other constructions, such as the integral casting of connecting elements, may avoid the need for welds or fasteners between some elements of the tipper 10.

In the illustrated embodiment, all of the actuators are preferably hydraulic actuators, specifically: the chute actuators 48; the chute stabilizer pad actuators 54; the tipping device primary and secondary actuators 86, 94; the trailer support arm actuators 110; the trailer cushioning actuators 114; and the platform stabilizer actuators 136. It is to be understood, however, that screw-driven, pneumatic, and other types of structurally equivalent actuators known to those skilled in the art may also be used for some, or all of the tipper actuators. It is also apparent that other devices, such as pulley and cable systems, may be substituted for the illustrated actuators.

In operation, the tipper 10 may be used to implement a method of successively removing the contents from a continuous stream of trailers 15. As a first step, the tipper 10 is positioned at a dumping location by a transport towing vehicle, such as a bull dozer (not shown), using the transport hitch 32. As seen in FIG. 3, a first trailer 15 hitched to a first truck 14 is towed up the front ramp 144 onto the platform 120 and into position alongside the carriage 38. Once in position, the first trailer 15 is unhitched from the first truck 14. If a tarp or other covering is provided over the top of the trailer 15, it is then removed. Of course, the tarp could be removed before the trailer 15 is positioned on the platform 120 or before unhitching.

As shown in FIGS. 1 and 3, the pivot arm actuators 110 extend to swing out the support arms 102 from beneath the carriage wall 80 and into engagement with the C-shaped receivers 148 on the underside of the trailer 15. The cushioning actuators 114 are extended until their heads 118 touch the side of the trailer 15, as shown in FIG. 5. With the cushioning actuators 114 extended and the support arms 102 securely gripping the trailer 15, the tipping operation is ready to begin.

As shown in FIGS. 5 and 6, a first stage of the inverting operation comprises extending both primary actuators 86. Extending each actuator 86 pivots the T-shaped member 68 clockwise about the pivot anchor beam 66 at the apex of the inverted V-shaped tipper frames 64. The trailer 15 is rotated upwardly through a first arc 150 about the pivot shaft 78 located along the stem 70. Preferably, this rotation covers approximately 75° of arc until the inverter 34 is positioned as shown in FIG. 6. During this first stage of the tipping operation, the crossarm portion 72 of the T-shaped member 68 remains parallel to the back side 84 of the tipping wall 80. The secondary actuator 94 remains retracted during this first stage of tipping.

FIGS. 5 and 6 also show the operation of the cushioning actuators 114 during the first stage of tipping. As the first tipping stage proceeds, under its own weight, the trailer 15 falls toward the carriage wall 80, with the trailer C-shaped receivers 148 sliding along the support arms 102. Each cushioning actuator head 118, initially extending across the gap between the carriage wall 82 and the trailer 15, slowly retracts under the weight of the trailer to cushion the impact of the trailer into the carriage surface 82. Eventually, the actuator heads 118 reach a fully retracted position resting in recess 119 of the carriage 80 (FIG. 6). The rate of retraction of the cushioning actuators 114 may be adjustable to govern the speed of the movement of the trailer 15 against the carriage 80.

FIGS. 6 and 7 show a second stage of the dumping operation which completes the emptying portion of the cycle. The two pairs of secondary actuators 94 are extended to pivot the carriage 80 away from the initial parallel alignment with the crossarm 72 of the T-shaped member 68. The trailer 15 then rotates through a second arc 152 about the pivot shaft 92 located at one end of the crossarm 72. Preferably, this rotation covers approximately 75° of arc until the inverter 34 is positioned as shown in FIG. 7, with the trailer 15 being nearly upside down over the dumping chute. The trailer material is dumped from the top opening of the trailer, through the chute 42, and into the landfill.

After the completion of the second stage of the cycle, the first two stages may be essentially reversed to rotate the emptied trailer 15 back through arc 152, then through arc 150, and back to rest on platform 120. The cushioning actuators 114 may extend to move the trailer 15 away from the carriage 80 and into the position shown in FIG. 5. The trailer 15 may then be re-hitched to the truck 14, and towed off of the platform 120 down the second ramp 146. The tipper 10 is then left ready to receive a second trailer 15 for the emptying. The second trailer 15 is then unhitched from the second towing vehicle, and the tipping process is repeated. Between dumping cycles, the chute actuators 48 may be extended to clear the chute of any remaining refuse. The above steps may be repeated with a successive group of trailers to efficiently remove the contents from the trailers in a continuous stream.

In a typical landfill application, the tipper 10 may be moved to a new location at a given dumping site one or more times daily. To do this, the chute and platform stabilizer pads 50 and 142 are raised by retracting their respective stabilizer actuators 54 and 136, as shown in dashed lines in FIG. 5. As seen in FIG. 3, each trio of flanges 138 attaching the platform stabilizers 142 to platform 120, are configured to provide a recess for receiving the retracted platform stabilizer pad 142. This recess permits the stabilizer pad 142 to be retracted to an elevation above the underside of the trailer platform 120. The chute stabilizer feet 50 are retracted into abutment with the chute stabilizer actuators 54.

The front and back ramps 144, 146 are also raised by pivoting them upwardly and then securing them in their raised positions (see dashed lines of ramp 146 in FIG. 3). The dual pin connection attachments of the platform 120 and chute 42 to the transport 16 allow the tipper 10 to be moved as a unit at the landfill when the chute and the platform stabilizers 50, 142 are retracted. With the stabilizers 50, 142 retracted, the chute 42 and the platform 120 are cantilevered from the opposing sides 18, 20 of the transport.

During tipper 10 relocation at a dump site, the chute actuators 82 may be extended to move the chute 42 outwardly from transport 16 to act as a counterbalance to the platform 120, and any possible leftward (as viewed in FIG. 5) weight distribution of the inverter 34 upon the transport 16. The need to extend the chute 42 as a counterbalance of course depends upon the weight distribution of the tipper 10 as a whole, which may vary between different implementation designs of the tipper.

The tipper 10 is then hitched to the tipper towing vehicle (not shown) at hitch 32 and moved to a new dumping location. The tipper may be returned to the dumping configuration shown in FIG. 5 by essentially reversing the above steps.

For moving the tipper 10 on a highway between dumping sites, the chute 42 and platform 120 may be detached from the transport 16 by removing the platform and chute attachment pins 132 and 58 (see FIGS. 4 and 6, respectively). Any hydraulic lines or other power lines coupled to the actuators 136, 54 and 48 are also disconnected. The chute actuators 48 are also removed, permitting the chute 42 and platform 120 to be separated from the transport 16 and placed on flatbed trailers or the like for transportation on a highway. The hitch 32 may be used to couple the transport 16 to a truck for towing during such highway transport.

Having illustrated and described the principles of my invention with respect to a preferred embodiment, it should be apparent to those skilled in the art that my invention may be modified in arrangement and detail without departing from such principles. For example, other actuating means may be employed, such as screw-driven actuators or cable and pulley systems. Suitable dimensional variations and materials may be substituted for the components of the tipper illustrated herein. I claim all such modifications falling within the scope and spirit of the following claims.

I claim:

1. A portable tipper for dumping material from a trailer having an open top portion, comprising:

a portable elongate transport having a longitudinal axis and opposing first and second sides;

a trailer inverter having a tipper device mounted to the transport, and a carriage supported by the tipper device, the carriage having an extendable and retractable support portion; and the carriage having a rest configuration wherein the support portion is retracted to permit the trailer to be moved into tipping position closely alongside the carriage without the carriage substantially vertically supporting the trailer, and the carriage having an extended tipping configuration wherein the support portion is extended from the carriage to engage and vertically support the trailer in the tipping position, the tipper device inverting the carriage about at least one axis which is substantially parallel to the longitudinal axis to dump material from the open top portion of the trailer beyond the second side of the transport.

2. A tipper according to claim 1, wherein the support portion selectively extends by pivoting from the carriage to engage the trailer.

3. A tipper according to claim 2, wherein:

the support portion comprises a pair of support arms pivoted to swing outwardly from the carriage; and the trailer has an undercarriage with a receiver portion for receiving the support arms.

4. A tipper according to claim 1, wherein the carriage includes a trailer cushioner for cushioning the horizontal impact of the trailer against the carriage during dumping.

5. A tipper according to claim 1, further comprising an elongate trailer platform coupled to the transport first side for supporting the trailer while the carriage is in the rest configuration.

6. A tipper according to claim 1, wherein the tipper device is situated on one side of the carriage.

7. A tipper according to claim 1, further comprising a dumping chute mounted to the transport second side for receiving and conveying the material dumped from the trailer.

8. A tipper according to claim 7, wherein the dumping chute further comprises:

a chute floor declining downwardly away from the transport to conduct the dumped material through the chute and away from the transport;

at least two chute stabilizers supporting the dumping chute upon the ground, with the chute stabilizers being vertically adjustable, and the dumping chute being pivotally attached to the chute stabilizers to permit pivoting of the chute about an axis substantially parallel with the longitudinal axis; and a chute actuator supporting the chute from the platform, the chute actuator extendable to pivot the chute at the chute stabilizer members to elevate an angle of decline of the chute floor to facilitate cleaning of the chute.

9. A tipper according to claim 8, wherein:

the tipper further includes an elongate trailer platform coupled to the transport first side for supporting the trailer for engagement by the carriage, and at least two platform stabilizers mounted to the platform, with the platform stabilizers being selectively elevatable and lowerable for supporting the platform upon the ground;

the chute stabilizers and the platform stabilizers are retractable; and the chute and the platform are cantilevered from the opposing sides of the transport when the chute stabilizers and platform stabilizers are retracted to permit portable transport with the chute and platform moved in unison with the transport when the transport is moved.

10. A tipper according to claim 1, wherein the tipper device rotates the tipping carriage through a plurality of arcuate paths to invert the trailer for dumping.

11. A tipper according to claim 10, wherein the tipper device comprises:

a tipper frame member mounted upon the transport;

a T-shaped member pivotally mounted on the tipper frame member, the T-shaped member having a crossarm and a stem with an intermediate portion thereof pivotally attached to the tipper frame member, the T-shaped portion crossarm having an upper end pivotally connected to the tipping carriage;

a primary actuator interconnecting a lower end of the T-shaped member crossarm and the transport, the primary actuator being pivotally connected to the crossarm lower end and to the transport; and a secondary actuator interconnecting the base of the T-shaped member stem and the tipping carriage, the secondary actuator extending alongside the stem, the secondary actuator being pivotally connected to the stem base and to the tipping carriage.

12. A system for emptying a trailer containing dumpable material at a dumping site, the trailer having an open top, comprising:

a portable elongate transport, the transport having a longitudinal axis;

an inverter, the inverter having a tipper device mounted upon the transport, the tipper device rotatably supporting an elongate tipping carriage, the tipping carriage having a vertical support surface and an extendable and retractable horizontal support member, the tipping carriage extending parallel with the longitudinal axis; and the tipping carriage having a retracted rest configuration wherein the horizontal support member is retracted to permit the trailer to be positioned in an upright orientation alongside the vertical support surface without being substantially supported by the carriage, and the carriage having an tipping configuration with the horizontal support member extended to vertically support the trailer while the trailer is in the upright orientation alongside the vertical support surface, and the horizontal support member and the vertical support surface vertically and horizontally supporting the trailer while the tipping device rotates the carriage with the trailer held therein.

13. A system for emptying trailers according to claim 12, wherein:

a trailer-supporting platform rigidly attachable to a first longitudinal side of the transport, the platform having retractable platform stabilizers supporting the platform upon the ground, the platform being in cantilever suspension from the first longitudinal side of the transport when the retractable platform stabilizers are retracted;

a dumping chute being rigidly attachable to the opposing longitudinal side of the transport, the chute having retractable chute stabilizers supporting the chute upon the ground, the chute being in cantilever suspension from the opposing longitudinal side of the transport when the retractable chute stabilizers are retracted; and the transport being movable while the platform and the chute are cantilevered from the transport first longitudinal side and the transport opposing longitudinal side, respectively.

14. A system for emptying a trailer containing dumpable material according to claim 12, wherein a plurality of extendable support arms are extended from the carriage in the extended configuration to engage beneath the trailer to support the trailer.

15. A tipper for dumping material from a trailer, comprising:

a portable transport;

a tipper device mounted on the transport and supporting a tipping carriage, the tipper device having a tipper frame member mounted upon the transport;

a T-shaped member pivotally mounted on the tipper frame member, the T-shaped member having a crossarm and a stem with an intermediate portion thereof pivotally attached to the tipper frame member, the T-shaped portion crossarm having an upper end pivotally connected to the tipping carriage;

a primary actuator interconnecting a lower end of the T-shaped member crossarm and the transport, the primary actuator being pivotally connected to the crossarm lower end and to the transport; and a secondary actuator interconnecting the base of the T-shaped member stem and the tipping carriage, the secondary actuator extending alongside the stem, the secondary actuator being pivotally connected to the stem base and to the tipping carriage.

* * * * *